Jan. 7, 1964  J. WALTER  3,116,790
TUBE HEAT EXCHANGER
Filed March 11, 1959  2 Sheets-Sheet 1
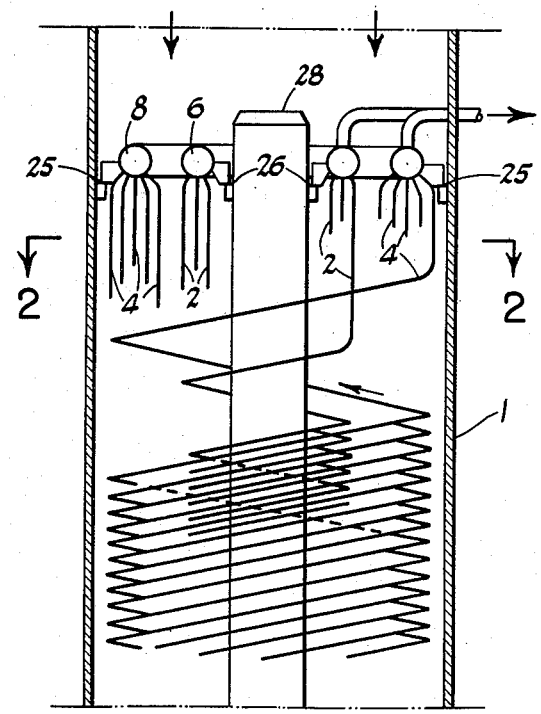
FIG. I
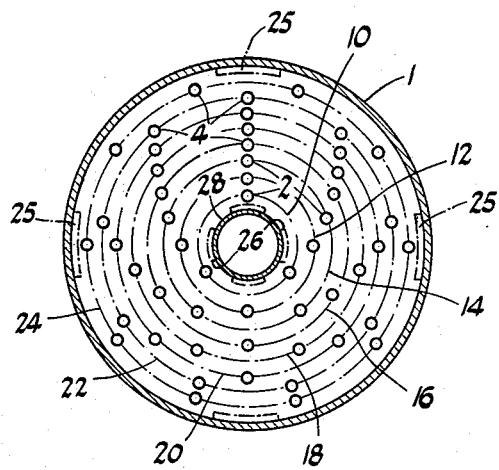
FIG. 2
INVENTOR.
JOSEF WALTER
BY
AGENT

United States Patent Office 3,116,790
Patented Jan. 7, 1964

3,116,790
TUBE HEAT EXCHANGER
Josef Walter, Esslingen (Neckar), Germany, assignor to Kohlenscheidungs-Gesellschaft, m.b.H., a corporation of Germany
Filed Mar. 11, 1959, Ser. No. 798,634
Claims priority, application Germany Mar. 28, 1958
2 Claims. (Cl. 165—163)

The invention relates to a tubular heat exchanger and is more particularly concerned with a heat exchanger as employed in connection with atomic nuclear reactors in which a heat transfer medium such as carbon dioxide is made use of to transfer the heat being liberated in the nuclear reactor to a heat exchanger for the heating of a fluid, for instance, water for steam generation.

In a heat exchange apparatus of this type the temperature of the heating medium leaving the reactor is relatively low when compared with that leaving the furnace of a conventional steam generating apparatus. However it is desirable to produce steam of high temperature and high pressure for reasons of thermal efficiency. Since the temperature differential between the heat transfer medium and the steam produced is comparatively low, a large amount of costly heat exchange surface must therefore be employed in the steam generator. This costly large heating surface could be reduced by increasing the heat transfer rate in a well known manner through an increase in the relative velocity of the fluids involved. However, such velocity increase is undesirable because of the large pressure drop thereby produced in the flow circuits.

The herein disclosed apparatus immeasurably contributes to a ready solution of the above problem by arranging and shaping the tubular steam generating and heating surface so that the space available within the steam generator housing is being made use of in the most advantageous and economical manner. At the same time the invention provides for speedy and convenient replacement of certain portions of the steam generating or steam heating tube bank. Considerable savings in construction material, maintenance costs, and reduction in size of the steam generating apparatus can thereby be achieved.

In accordance with the present invention this is accomplished by employing tubes which are helically wound about the axis of the housing and form tube bundles, each tube bundle consisting of telescoping helically wound tubes.

In this manner, it is possible, in accordance with the invention, to provide the different tube bundles with tubes having equal slope or pitch, having equal spacing in a horizontal and/or a vertical direction, and having equal lengths. This permits the extensive utilization of the housing interior in accommodating a large tubular heating surface. Moreover, a high gas velocity coupled with a relatively low draft loss can thereby be achieved as well as a sufficient slope of the tubes for effective withdrawal of the generated steam. The inventive design in addition provides for a uniform heating of the cooling medium as well as a uniform and low pressure loss in the tubes. Furthermore the invention results in a relatively simple form of construction by nesting the different tube groups including the respective headers, and by maintaining equal bending radii for the tubes of each individual tube group. Thus heat exchangers of various sizes can be produced by merely changing the height, number of tubes and number of tube bundles.

Other objects and advantgaes of the invention will become apparent from the following description of illustrative embodiments thereof when taken in conjunction with the accompanying drawing wherein:

FIG. 1 is a partial vertical section through the tubular heat exchanger of the herein disclosed inventive design;

FIG. 2 is a horizontal section through the heat exchanger when taken on line 2—2 of FIG. 1.

Figure 3:
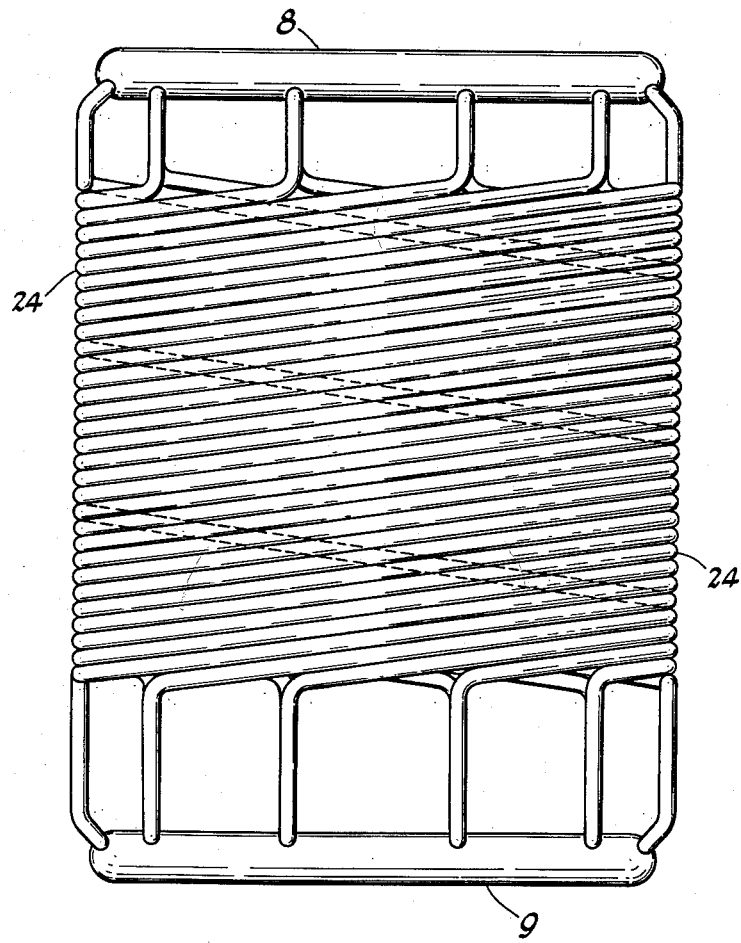
FIG. 3 is a representation of the outer band of tubes forming a spirally wound cylinder as shown in FIGS. 1 and 2, with inlet and outlet headers connected thereto.

The tubular heat exchanger illustratively depicted in FIGS. 1 and 2 comprises a cylindrical housing 1 through which a stream of hot gases such as carbon dioxide passes in the direction indicated by the arrow, these gases having been heated by a heat source such as an atomic nuclear reactor (not shown). Within the housing there are arranged helically wound tubes 2 and 4 the upper ends thereof being shown as connected to ring headers 6 and 8 respectively. The lower ends of the tubes may be joined to similar headers (not shown). A heat absorbing or cooling medium such as water or steam, for instance, is made to flow through these tubes and headers and is being heated by absorbing heat from the hot gases the cooling medium preferably flowing in counterflow relation with the heating gases in the direction indicated by the arrows. Thus as shown in FIG. 1 for instance, the water flows upwardly and the gases flow downwardly the water absorbing enough heat to be evaporated into steam. The steam after being heated to the desired temperature leaves at the top of the heat exchanger and is conducted to a steam turbine or other place of use, not shown. Tubes 2 and 4 are formed to follow screw-shaped or helical paths disposed about the longitudinal axis of the housing 1 such paths following the surfaces of imaginary cylinders 10, 12, 14, 16, 18, 20, 22 and 24 which are arranged coaxially with housing 1. These imaginary cylinder surfaces are preferably spaced equal radial distances from each other. Moreover in accordance with the invention cylinder 10 may be formed of 3 tubes, cylinder 12 of 4 tubes, cylinder 14 of 5 tubes, cylinder 16 of 6 tubes, cylinder 18 of 7 tubes, cylinder 20 of 8 tubes, cylinder 22 of 9 tubes and cylinder 24 of 10 tubes. All these tubes may be divided into two or more groups, two groups, 2 and 4, being shown in FIG. 1. The inner tube group 2 comprises the inner three rows of tubes, those following cylinders 10, 12 and 14. The outer group comprises the outer five tube rows following cylinders 16, 18, 20, 22 and 24. For clarity's sake only one tube of the inner group 2 and one tube of the outer group 4 are illustratively shown in FIG. 1 as following helical paths concentric with the longitudinal axis of the housing 1. Each of the remaining tubes are shaped and constructed in like manner.

In accordance with the invention all the tubes are substantially of equal length and follow a helical path of equal slope or pitch. Furthermore these tubes are equally spaced both in horizontal as well as vertical direction. The tubes 2 of the inner group are connected to header 6 and the tubes 4 of the outer tube group are connected to header 8, which headers are independent of each other. Header 8 is shown to be supported on brackets 25 which in turn are attached to the inside of housing 1. Header 6 is in similar manner supported by brackets 26 which are attached to central cylindrical member 28. In this manner each tube row as well as each tube group is arranged in telescoping or nesting relation with each other. Accordingly the herein disclosed design permits ready and convenient removal and replacement of each individual tube bank, independent of adjacent tube banks, by withdrawing the tubes and header in longitudinal direction either through the top of the heat exchanger or the bottom thereof.

FIG. 3 shows a more detailed illustration of one of the cylindrical and spirally formed tube rows of my improved heat exchanger. For clarity's sake FIG. 3 shows only the largest cylinder formed of the ten coils or spiral tubes that correspond to the outermost row 24 (see FIG.

2), with upper header 8 and lower header 9 connected thereto. No attempt is made to show the other rows of tubes 16, 18, 20, and 22 also connected to headers 8 and 9, or to show inner header 6 with the tube rows 10, 12, 14 issuing therefrom, since additional showing would only tend to confuse the presentation. Thus FIG. 3 is a representative illustration of one row or band of tubes with inlet and outlet headers, other rows or bands of tubes and header combinations being of similar construction, as indicated in FIGS. 1 and 2.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In a tubular heat exchanger, a cylindrical housing for receiving and passing a heating fluid therethrough; a plurality of cylindrical helices of progressively increased diameters, said helices being equally spaced from each other and nested within each other and concentrically disposed within said housing in axial alignment therewith for flow of a single heat absorbing fluid therethrough; each helix being formed of a band of parallelly spaced tubes wound about an imaginary cylinder; the number of parallel tubes comprising each band increasing in arithmetical progression by a constant whole number from the innermost helix to the outermost helix; the pitch, tube spacing, and length of the tubes of one helix and the axial length thereof being equal to the pitch, tube spacing, and length of tubes and axial length of any other helix, and the diameters of said helices being proportional to the respective number of tubes of which each helix is formed, to achieve uniform cooling and flow losses of the heating fluid as it passes through said housing and uniformly equal heating and flow losses of the heat absorbing fluid as it passes through each of said tubes of each of said helixes, whereby the most economical use is made of the space within said housing.

2. In a tubular heat exchanger, a cylindrical housing for receiving and passing a heating fluid therethrough; a plurality of cylindrical helices of progressively increased diameters, said helices being uniformly spaced from each other and nested within each other and concentrically disposed within said housing in axial alignment therewith for flow of a single heat absorbing fluid therethrough; each helix being formed of a band of parallelly spaced tubes wound about an imaginary cylinder; the number of parallel tubes comprising each band increasing in arithmetical progression by a constant whole number from the innermost helix to the outermost helix to achieve substantially equal heat absorption throughout the cross-sectional flow area of said heating fluid; the pitch, tube spacing, and length of the tubes of one helix and the axial length thereof being equal to the pitch, tube spacing, and length of tubes and axial length of any other helix; the diameters of said helices being proportional to the respective number of tubes of which each helix is formed, the ends of the tubes of contiguous helices terminating in a plurality of concentric ring headers, the inside ring diameter and the outside ring diameter respectively of each header being larger and smaller than the outside diameter of the smaller adjacent helix or ring header and the inside diameter of the larger adjacent helix or ring header, respectively, to achieve uniform cooling and flow losses of the heating fluid as it passes through said housing and uniformly equal heating and flow losses of the heat absorbing fluid as it passes through each of said tubes of each of said helices, whereby the most economical use is made of the space within said housing.

References Cited in the file of this patent

UNITED STATES PATENTS

| | | |
|---|---|---|
| 1,777,708 | Wade | Oct. 7, 1930 |
| 1,825,433 | White | Sept. 29, 1931 |
| 1,884,778 | Lucke | Oct. 25, 1932 |
| 1,919,029 | Lucke | July 18, 1933 |
| 2,508,247 | Giauque | May 16, 1950 |